(12) United States Patent
Nathan et al.

(10) Patent No.: US 8,141,947 B2
(45) Date of Patent: Mar. 27, 2012

(54) HAPTIC SEATING SYSTEM

(75) Inventors: John F. Nathan, Highland, MI (US);
Arti Rohit Mujumdar, Thane (IN);
Santosh Karumathil, Thane (IN);
Sandhya Singh, Mumbai (IN); Karl R. Kennedy, Fraser, MI (US)

(73) Assignee: Lear Corporation, Southfield, MI (US)

( * ) Notice: Subject to any disclaimer, the term of this patent is extended or adjusted under 35 U.S.C. 154(b) by 601 days.

(21) Appl. No.: 11/776,908

(22) Filed: Jul. 12, 2007

(65) Prior Publication Data
US 2009/0015045 A1 Jan. 15, 2009

(51) Int. Cl.
*A47C 31/00* (2006.01)
*H04B 3/36* (2006.01)

(52) U.S. Cl. .................. 297/217.3; 340/407.1

(58) Field of Classification Search ............... 340/407.1; 297/217.3
See application file for complete search history.

(56) References Cited

U.S. PATENT DOCUMENTS

| 6,369,529 | B1* | 4/2002 | McClintock et al. | 318/16 |
| 6,957,128 | B1* | 10/2005 | Ito et al. | 701/1 |
| 7,245,231 | B2* | 7/2007 | Kiefer et al. | 340/903 |
| 7,369,042 | B2* | 5/2008 | Osaka et al. | 340/435 |
| 2002/0015373 | A1* | 2/2002 | Novotny et al. | 369/71 |
| 2002/0145512 | A1* | 10/2002 | Sleichter et al. | 340/407.1 |
| 2002/0195290 | A1* | 12/2002 | Hayakawa | 180/277 |
| 2004/0049323 | A1* | 3/2004 | Tijerina et al. | 701/1 |
| 2008/0100476 | A1* | 5/2008 | Kim | 340/995.2 |

FOREIGN PATENT DOCUMENTS

| JP | 60049405 | * | 3/1985 |
| KR | 2006020851 | * | 7/2006 |

* cited by examiner

*Primary Examiner* — James Trammell
*Assistant Examiner* — Muhammad Shafi
(74) *Attorney, Agent, or Firm* — Brooks Kushman P.C.

(57) ABSTRACT

A haptic seating system for use in imparting a haptic sensation to a seat. The seating system being suitable for use in a vehicle or other environment having multiple network nodes with capabilities sufficient to issue instructions suitable to instructing a haptic element used to impart the haptic sensation. The system may include the network nodes issuing the instructions through signals carried over the network.

13 Claims, 3 Drawing Sheets

HAPTIC SEATING SYSTEM

BACKGROUND OF THE INVENTION

1. Field of the Invention

The present invention relates to methods and systems associated with imparting a haptic sensation to a seat.

2. Background Art

A haptic seat includes a motor or other device to impart a haptic sensation to an occupant seated within the seat. The haptic sensation can be used to alert the passenger to various vehicle operation conditions, to massage portions of the passenger's body, and to perform any number of other operations. Regardless of the construction of the device or whether it is used for alert or massage, a separate control module is dedicated to controlling the operation thereof.

Multiple devices may be included within the same seat and controlled with the same controller. The controller may be attached to the seat or floor area around the seat with control lines leading to each of the haptic devices. The controller receives signals for controlling the haptic sensation according to inputs received from user actuated buttons included on the controller, which is common for massage orientated systems, and/or according to other signals received over a vehicle network (CAN), which is common for alert orientated systems.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
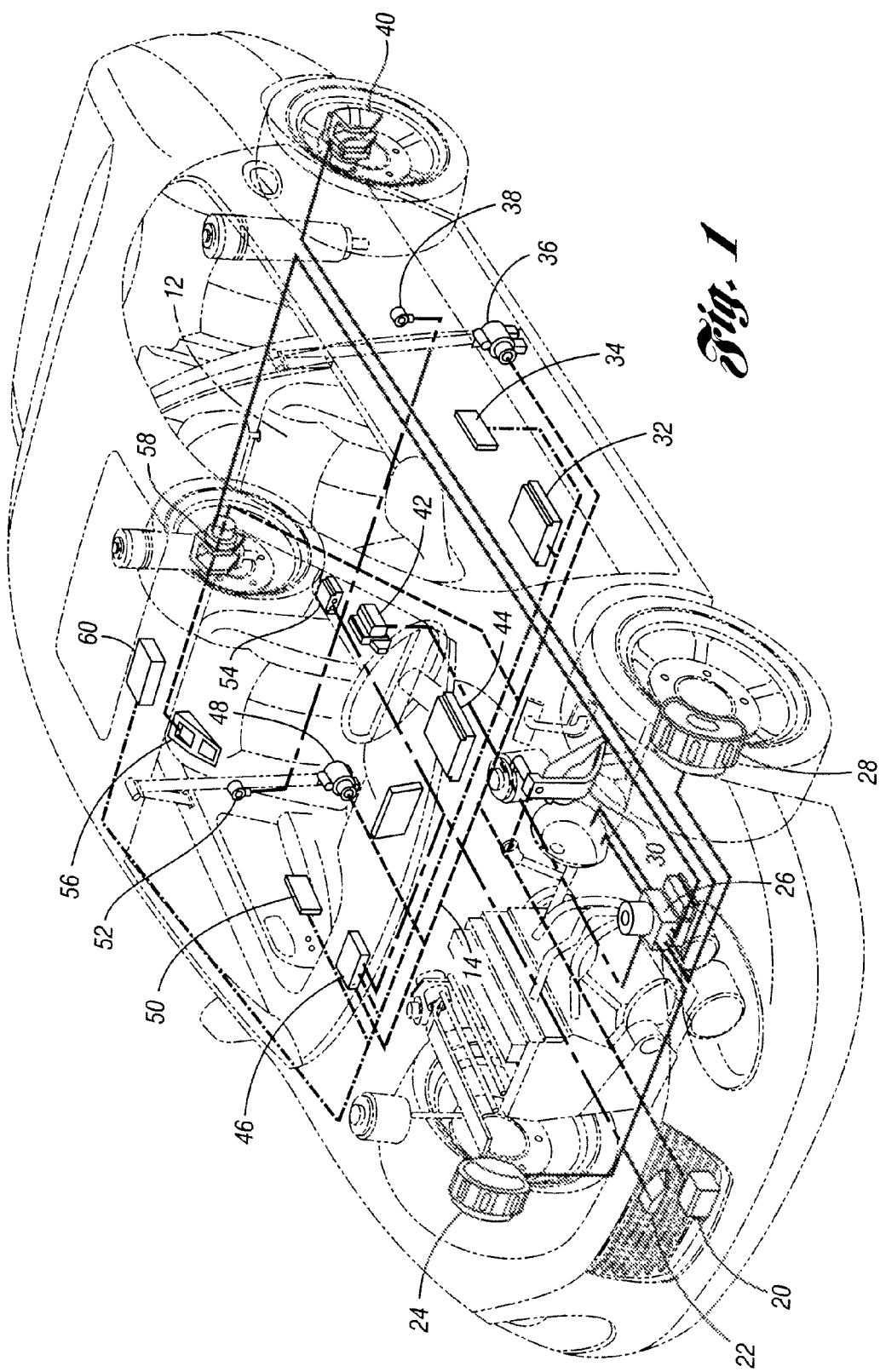
FIG. 1 illustrates a haptic seating system in accordance with one non-limiting aspect of the present invention.

FIG. 1 illustrates a haptic seating system 10 in accordance with one non-limiting aspect of the present invention. The system 10 may include a number of vehicle systems and one or more haptic seats 12. The vehicle systems may be configured to control or support various vehicle operations. The haptic seat 12 may be configured to impart a haptic sensation to an occupant, such as to support alert or massage operations. A vehicle network 14, commonly referred to as a Controller Area Network (CAN), can be include to carry signals between the vehicle systems and haptic seat.

The present invention is predominately described with respect to a vehicle and the vehicle systems commonly associated therewith. These vehicle systems may be comprised of or include a portion of the various elements 20-60 shown in FIG. 1. The elements 20-60 may include but are not limited to a frontal approximation sensor 20, stability controller 26, adaptive cruise controller 42, body controller 46, anti-lock brakes 24, 28, 40, 60, side impact sensor 34, 50, global positioning system 60, occupant sensor 32, 44, braking controller 30, reverse backup sensor 56, door sensors 52, 58, front collision sensor 22, reverse collision sensor 54.

The vehicle systems may include more of less of the following systems: collision warning, reverse backing, antilock braking, stability control, body control, massage control, and adaptive cruise controls, and/or other elements associated with controlling any number of vehicle related operations. The present invention contemplates the vehicle systems including any number of the devices or other features not shown in FIG. 1 to facilitate supporting the operations associated therewith.

Figure 2:
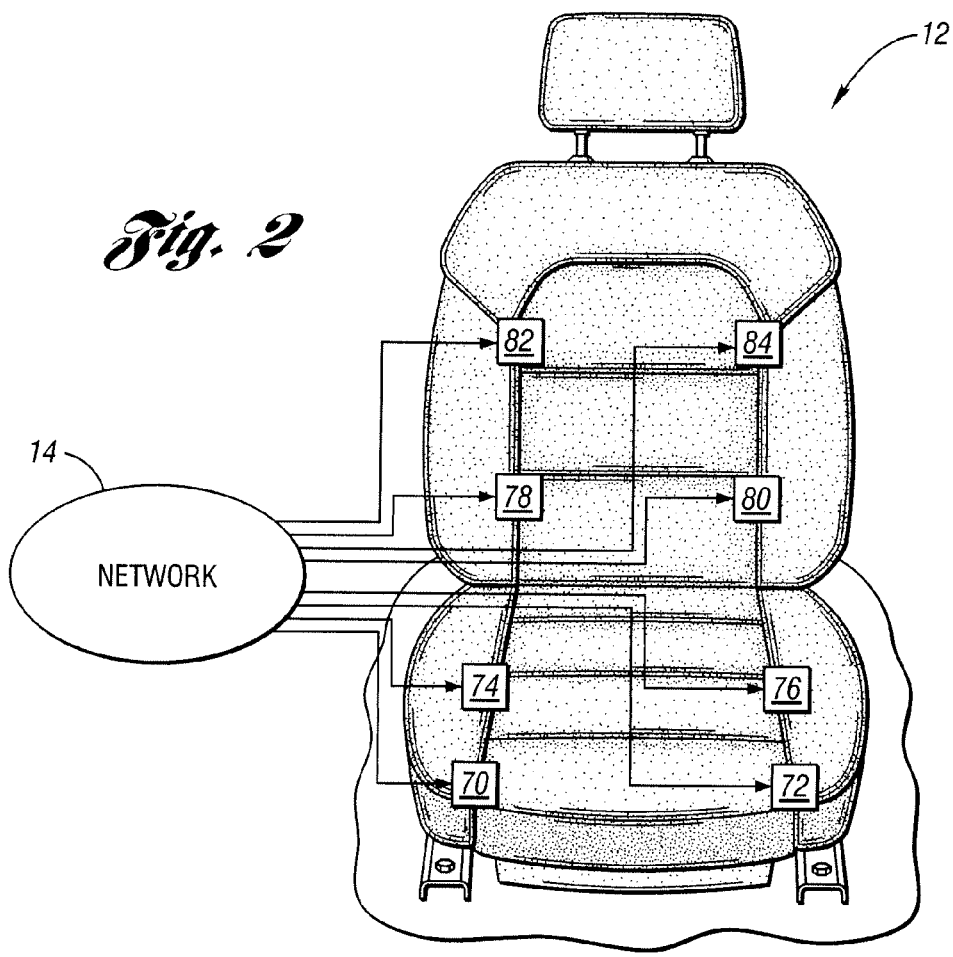
FIG. 2 illustrates the haptic seat in accordance with one non-limiting aspect of the presenting invention.

The vehicle systems may be generally characterized as those systems or groups of elements 20-60 acting in cooperation to facilitate coordinating vehicle operations with the other vehicle systems that communication signals over the network. FIG. 2 illustrates the haptic seat 12 in accordance with one non-limiting aspect of the presenting invention. The haptic seat 12 may include a number of haptic elements 70-84 configured to impart haptic sensation to seat occupants. These haptic elements 70-84 may be connected to the vehicle network 14 and configured to decode and/or transmit signals over the same to facilitate coordinating its operation with the other vehicle systems.

Figure 3:
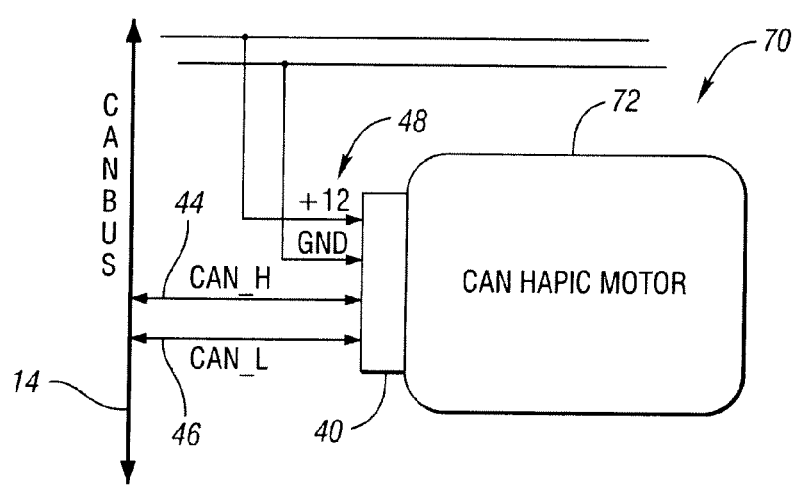
FIG. 3 schematically illustrates the haptic element in accordance with one non-limiting aspect of the present invention.

FIG. 3 schematically illustrates the haptic element 70 in accordance with one non-limiting aspect of the present invention. The haptic element 12 may include a decoder 90 and motor 92. The motor 92 may be controlled by the decoder 90 to impart a haptic sensation to the seat and the decoder 90 may be used to decode signals carried over the network 14. The decoded signals may include instructions or other information from the vehicle systems connected to the network 14. This information may be selected and transmitted by the vehicle systems to facilitating controlling the haptic elements. A network connection, shown with the commonly used high and low CAN lines 44, 46, and a power connection 48 may be used to power and communicate with the haptic element.

Figure 4:
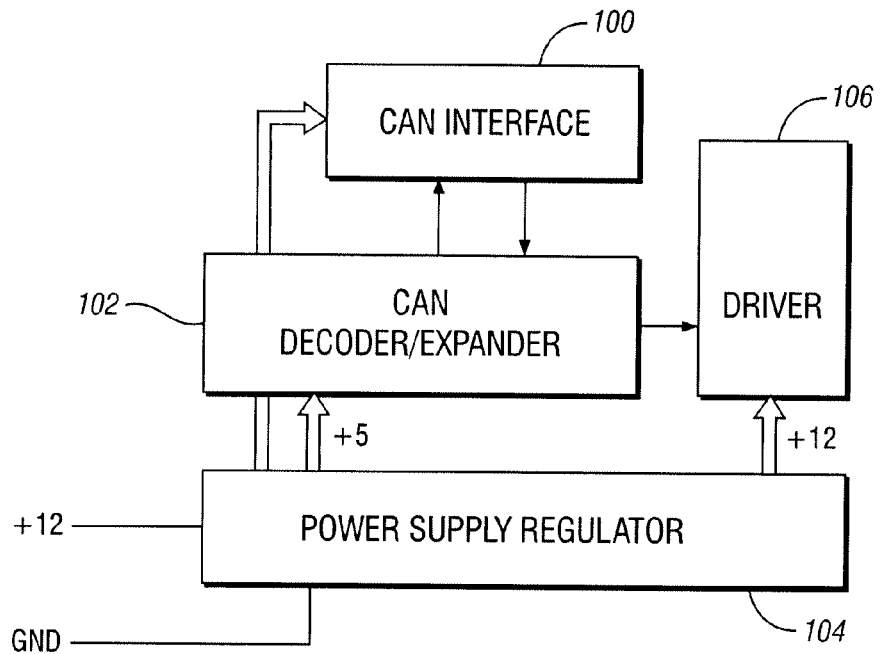
FIG. 4 schematically illustrates a more detailed view of the decoder in accordance with one non-limiting aspect of the present invention.

FIG. 4 schematically illustrates a more detailed view of the decoder 90 in accordance with one non-limiting aspect of the present invention. The decoder 90 may further include a network interface 100, a decoder/expander 102, a power regulator 104, and a driver 106. The network interface 100 may be configured to support signaling and other interactions between the haptic element 70 and the network 70. The decoder/expander 102, which may also be referred to as a controller or similar feature, decodes the signals received over the network 14 for use in control the imparted haptic sensation. The power regulator 104 may be configured to regulate power to the interface 100 and decoder/expander at a first power level and to regulate power to the driver 106 at a second power level. The driver 106 may be configured to drive the motor 92 according to the power received from the regulator 104 and according to the instructions received from the decoder/expander 102.

Figure 5:
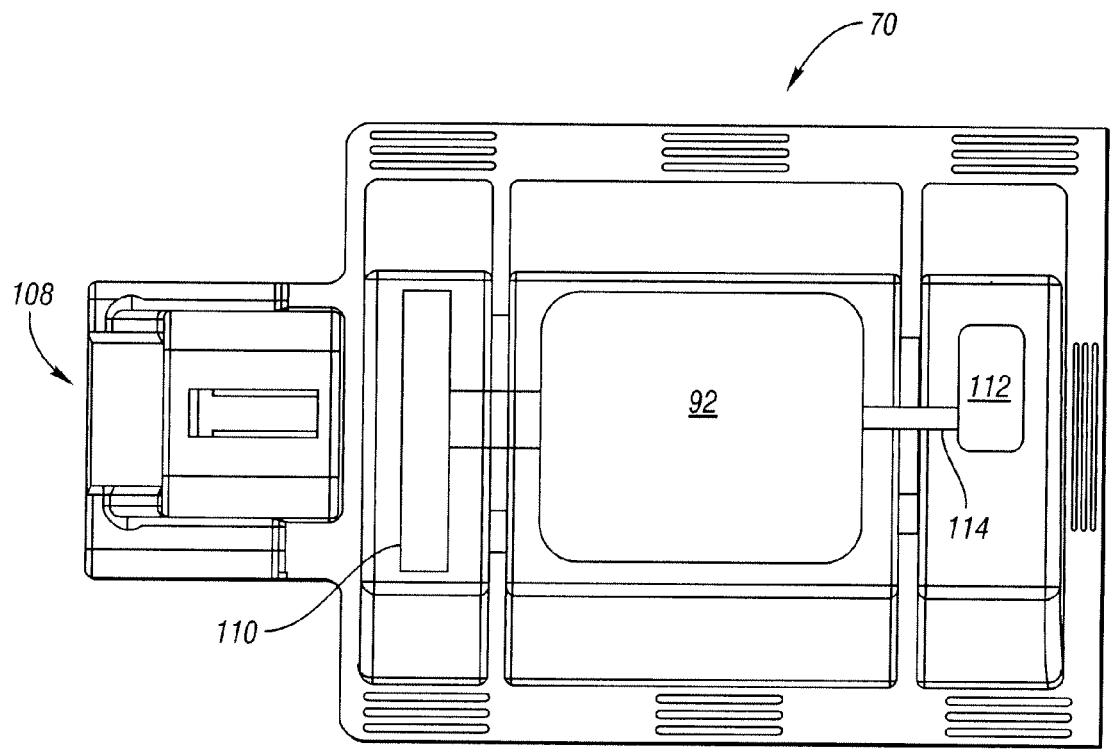
FIG. 5 schematically illustrates a more detailed view of the haptic element in accordance with one non-limiting aspect of the present invention

FIG. 5 schematically illustrates a more detailed view of the haptic element 70 in accordance with one non-limiting aspect of the present invention. A connector 108 may be included to electrically connect a printed circuit board 110 to the vehicle network 14 and power system. The motor 92 may include an electronically driven rotator 110 configured to rotate an eccentric weight 112 connected to a motor shaft 114. The rotation of the eccentric weight 112 may cause the motor 92 to vibrate in such a manner as to impart a haptic sensation to the seat occupant. The intensity and frequency at which the motor 92 vibrates may be controlled by the decoder 102 controlling the operation of the driver 106. The frequency and intensity may be varied, scaled, or otherwise controlled to correspond with whether the haptic element is being used to alert or massage the occupant. The signals received by the decoder 90 over the network 14 may include information to facilitate control operation of the motor 92, and thereby, the haptic sensation imparted to the seat. The vibration may be transmitted to any structure in the seat 12, including supports, framing, cushioning, distribution arms, and the like.

Returning to FIG. 2, the seat 12 may include a number of haptic elements 70-84. Each haptic element 70-84 may be configured as described above, i.e., such that each element 70-84 is an integrated module having a decoder 90 attached to an end of an eccentrically weighted motor 92. Of course, the present invention is not limited to the particular configuration of the haptic element 70-84 described above and fully contemplates the use of any haptic elements 70-84 having properties sufficient to impart a haptic sensation to the seat occupant, regardless of whether the haptic sensation is intended to support alert and/or massage operations. Moreover, the present invention fully contemplates the seat including haptic elements 70-84 of various design. This may include having a portion of the haptic elements 70-84 configured to support alert operations and a portion of the haptic elements configured differently to support massage operations.

Each of the haptic elements 70-84 may be separately connected to the vehicle network 14 through independent network connections. Like the devices shown in FIG. 1, the haptic seat elements 70-84 may be configured to separately communicate over the vehicle network 14. The independent connections of the haptic elements 70-84 to the network 14 may be advantageous with respect to eliminating the need for connecting a separate module between the haptic elements 70-84 and the network 14, such as a module used to distinguish and route signals intended for each of the haptic elements 70-84. This type of module is typically placed in or around each seat and provides the only network connection for the haptic elements to the vehicle network, i.e., it is connected between the network and the haptic elements such that each haptic element per seat is connected to the same module such that the module receives the network signals and determines control of the haptic element as function thereof.

The present invention, in contrast, contemplates eliminating the module and instead allowing the haptic elements 70-84 to be directly connected to the network. The haptic elements 70-84 may then be responsible for decoding signals and controlling their own operation. This may also require the other vehicle systems to include logic and other functions to facilitate issuing the instructions used to control the haptic elements. In this manner, each vehicle systems may separately communicate signals to one or more of the haptic elements to control the operational thereof. For example, the collision warning system may communicate signals associated with imparting a haptic sensation in order to alert the passenger of an upcoming collision, and/or the massage system may communicate signals associated with imparting a haptic sensation suitable to massaging the seat occupant.

Each of the haptic elements 70-84 may be assigned a unique network address. The network address may be used by the vehicle systems to selectively communicate with one or more of the haptic elements 70-84. For example, the present invention contemplates directionality control whereby haptic elements 70-84 on one side or one end of the seat are activated while the elements on the other side or other end of the seat are inactivated, such as for use with the stability control system to indicate the vehicle veering to one side of the road. The activated side of haptic elements 70-84 may then be switched to the other side if the vehicle begins to veer to far to the other side of the road. Optionally, the active haptic elements used during such directionality control may be controlled at the same frequency and intensity.

The unique network addresses may be assigned in any suitable manner. They may, for example, be assigned to the haptic elements 70-84 at the time of manufacture and/or by one of the vehicle elements in charge of supporting the network. The ability to assign and identify the unique network addresses for each of the haptic elements 20-60 allows haptic elements 20-60 to be easily added and removed from the network in a dynamic manner. This can be helpful in aftermarket settings where it may be desirable to added additional haptic elements, such as to support massage operations, after the vehicle is manufactured. The additional element can be easily identified on the network 14 and controlled with software upgrades or other potentially minimally invasive programming of the vehicle systems intended to support controlling the haptic elements.

Because the vehicle systems are able to independently and separately communication with the haptic elements 70-84, i.e., without a dedicated module to distinguish the signals for the haptic elements 70-84, the vehicle systems may include a dispute resolution application or logic to limit the number of vehicle systems controlling the haptic elements. In particular, one issue may arise if multiple vehicles systems are simultaneously attempting to control the same haptic element 70-84. The vehicle systems attempting to control the same haptic element 70-84 at the same time may cooperatively determine the highest priority vehicle system. The lower priority vehicle system(s) may then be prohibited from controlling the desired haptic element 70-84. Any safety related capabilities of the control requesting vehicle system may be considered with determining the higher priority vehicle system, such as allowing the collision system to override the massage system, so that the more important safety function is achieved.

The haptic elements 70-84 may be reactive type devices that automatically decode and act in response to the signals that are addressed to it. The lower priority vehicle system(s) may be prevented from issuing such control signals if the haptic element 70-84 is unable to determine which one of the vehicle systems has the highest priority, as this may be helpful in preventing improper control or disruption of the haptic elements 70-84 receiving conflicting signals. The haptic elements 70-84, however, may be configured to read a priority code or other value included within the signals to determine the higher priority vehicle system such that it may be unnecessary to request the lower priority vehicle systems to prevent signal transmissions. This may be helpful, for example, to allow the massage system to issue signals requesting massage to continue while being temporarily superseded by the collision warning system transmitting signals for alerting the seat passenger.

The haptic element 70-84, or in some cases the decoder 102, may be programmed to shut-off or take other action if an improper or corrupted signal is addressed to it. This may be helpful preventing continued operation if multiple vehicle systems are attempting to the control the haptic element and/or to prevent operation in response to corrupted signals, which, for example, could otherwise cause the haptic element to issue an unnecessary alert to the seat occupant.

As required, detailed embodiments of the present invention are disclosed herein; however, it is to be understood that the disclosed embodiments are merely exemplary of the invention that may be embodied in various and alternative forms.

The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A haptic seating system for use in a vehicle having a passenger seat and a number of vehicle systems configured to control vehicle operations wherein the vehicle systems transmit signals over a vehicle network in order to coordinate vehicle operations, the system comprising:

a first haptic element positioned within a first position of the seat and a second haptic element positioned within a second position of the seat, the first haptic element including a first decoder and a first motor and the second haptic element including a second decoder and a second motor, wherein the first decoder is configured to decode signals carried over the vehicle network for use in controlling haptic sensations imparted by the first motor and the second decoder is configured to decode signals carried over the vehicle network for use in controlling haptic sensations imparted by the second motor, wherein the first decoder is dedicated to the first motor and the second decoder is dedicated to the second motor such that the first decoder is unable to decode signals for use in controlling the second motor and the second decoder is unable to decode signals for use in controlling the first motor;

wherein the first decoder is assigned a unique first network address and the second decoder is assigned a unique second network addresses, thereby requiring signals carried over the vehicle network for use in controlling haptic sensations to specify the network address of the first and second decoders corresponding with the first and second motors desired to impart the haptic sensation;

wherein the vehicle network is configured such that signals carried over the vehicle network to control the imparted haptic sensations are commonly received by each of the first and second decoders; and wherein the first decoder is configured to only impart haptic sensations for the signals specifying the first network address and the second decoder is configured to only impart haptic sensations for the signals specifying the second network address, thereby eliminating a need for a central control module to receive communications and decide whether the first and second haptic element is to impart the haptic sensations specified therein.

2. The system of claim 1 further comprising at least one additional haptic element positioned within the seat and connected to the network, each haptic element being separately controlled according to signals carried over the network.

3. The system of claim 2 wherein at least one haptic element is located on one side of the seat and another haptic element is located on another side of the seat, wherein the vehicle systems are configured control the haptic elements on both sides of the seats to impart the haptic sensation with the same intensity, wherein the vehicle systems are configured to provide directionality to the haptic sensation by turning off the haptic elements on one side of the seat so that only the haptic elements on the other side of the seat impart the haptic sensation.

4. The system of claim 3 wherein only the highest priority vehicle system transmits signals over the network to control the haptic element.

5. The system of claim 2 wherein the haptic elements are connected to the vehicle network with independent network connections included as part of the corresponding first and second decoder, wherein the vehicle network is a Controller Area Network (CAN) and each of the independent network connections include a high CAN line and a low CAN line configured to connect the corresponding first and second decoder to the vehicle network.

6. The system of claim 1 wherein the haptic element is controlled according to a highest priority vehicle system if multiple vehicle systems simultaneously attempt to control the motor.

7. The system of claim 1 wherein the haptic element is unable to distinguish a highest priority vehicle system if multiple vehicle system simultaneously attempt to control the haptic element such that the vehicle systems execute a dispute resolution process to determine the highest priority vehicle system.

8. The system of claim 1 wherein each vehicle system issues customized signals for controlling the haptic element so that each vehicle system can control the haptic element differently.

9. The system of claim 1 wherein the motor is eccentrically weighted to generate vibrations used to impart the haptic sensation.

10. The system of claim 1 wherein each of the vehicle systems are required to independently specify an intensity and a frequency at which a motor included within the haptic element is to rotate in order to control the haptic sensation imparted by the haptic element.

11. The system of claim 1 wherein each decoder is able to detect for corruption of signals intended to control the haptic sensations and to prevent imparting of the haptic sensations in the event signals are corrupt, the signals being determined to be corrupt in the event the signals result in imparting haptic sensations that cause an unnecessary alert.

12. The system of claim 1 wherein the dispute resolution process requires each vehicle system attempting to control the haptic element to transmit a corresponding request over the vehicle network to be received by the other vehicle systems and to monitor the vehicle network for requests from higher priority vehicle systems, wherein each lower priority vehicle system ceases signaling intended to control the haptic element in the event a request from a higher priority vehicle system is detected and each lower priority vehicle system is prevented from issuing requests while a higher priority vehicle system is controlling the haptic element.

13. The system of claim 1 wherein the first decoder is configured to route signals to no more than the first motor and the second decoder is configured to route signals to no more than the second motor.

* * * * *